(12) United States Patent
Liu

(10) Patent No.: US 12,315,220 B2
(45) Date of Patent: May 27, 2025

(54) METHODS AND SYSTEMS FOR INDEXING EMBEDDING VECTORS REPRESENTING DISJOINT CLASSES AT ABOVE-BILLION SCALE FOR FAST HIGH-RECALL RETRIEVAL

(71) Applicant: Clearview AI, Inc., New York, NY (US)

(72) Inventor: Zhi Liu, New York, NY (US)

(73) Assignee: Clearview AI, Inc., New York, NY (US)

( * ) Notice: Subject to any disclaimer, the term of this patent is extended or adjusted under 35 U.S.C. 154(b) by 0 days.

(21) Appl. No.: 18/214,782

(22) Filed: Jun. 27, 2023

(65) Prior Publication Data

US 2025/0005896 A1    Jan. 2, 2025

(51) Int. Cl.
*G06V 10/74* (2022.01)
*G06V 10/82* (2022.01)

(52) U.S. Cl.
CPC ............ *G06V 10/761* (2022.01); *G06V 10/82* (2022.01)

(58) Field of Classification Search
CPC .............................. G06V 10/761; G06V 10/82
See application file for complete search history.

(56) References Cited

U.S. PATENT DOCUMENTS

| | | | | |
|---|---|---|---|---|
| 5,970,495 A * | 10/1999 | Baru | ..................... | G06F 9/5088 707/999.102 |
| 8,874,584 B1 * | 10/2014 | Chen | ................... | G06F 16/7854 707/741 |
| 11,250,266 B2 * | 2/2022 | Ton-That | ............... | G06V 40/45 |
| 11,443,553 B1 * | 9/2022 | Liu | ....................... | G06V 10/762 |
| 11,625,429 B2 * | 4/2023 | Yang | ................... | G06Q 30/0627 707/747 |
| 12,050,576 B2 * | 7/2024 | Sedan | .................... | G06F 16/215 |
| 2015/0154192 A1 * | 6/2015 | Lysne | ...................... | G06N 5/00 707/758 |
| 2019/0138554 A1 * | 5/2019 | Remis | .................. | G06V 40/172 |
| 2019/0179858 A1 * | 6/2019 | Douze | ................. | G06F 16/2365 |
| 2019/0332492 A1 * | 10/2019 | Marelas | ................ | G06F 16/137 |
| 2022/0139073 A1 * | 5/2022 | Kim | ....................... | G06V 10/16 382/155 |
| 2022/0230053 A1 * | 7/2022 | Betthauser | ............. | G06N 3/045 |
| 2022/0350805 A1 * | 11/2022 | Ma | ............................ | G06N 3/08 |
| 2023/0021996 A1 * | 1/2023 | Lassance | ............... | G06N 3/047 |
| 2023/0196430 A1 * | 6/2023 | Pumma | .............. | G06Q 30/0625 706/12 |

FOREIGN PATENT DOCUMENTS

CN     111476105 A  *  7/2020
CN     114741544 A  *  7/2022

OTHER PUBLICATIONS

Qin, An, Mengbai Xiao, Ben Huang, and Xiaodong Zhang. "Maze: A Cost-Efficient Video Deduplication System at Web-scale." In Proceedings of the 30th ACM International Conference on Multimedia, pp. 3163-3172. 2022.*

* cited by examiner

*Primary Examiner* — Xuemei G Chen
(74) *Attorney, Agent, or Firm* — Fox Rothschild LLP

(57) ABSTRACT

This disclosure provides novel methods and systems for indexing embedding vectors representing disjoint classes at above-billion scale for fast high-recall retrieval. The disclosed methods and systems solved above-billion scale image (e.g., face image) search problems by building a new vector database, the new Nearest Neighbor Database (NNDB) based on a novel architecture for indexing vectors.

28 Claims, 4 Drawing Sheets

METHODS AND SYSTEMS FOR INDEXING EMBEDDING VECTORS REPRESENTING DISJOINT CLASSES AT ABOVE-BILLION SCALE FOR FAST HIGH-RECALL RETRIEVAL

FIELD

This invention relates generally to methods and systems for embedding vectors representing disjoint classes at above-billion scale for fast high-recall retrieval.

BACKGROUND

The task of classification has been the subject matter for computer science researchers since computers could be useful. The concepts of "same" and "different" span across varying scales—from binary classification to classification of billions of unique entities. There are broad applications for algorithms that let us efficiently recognize and retrieve things that are the same and tell apart things that are different. For example, in the case of merchandise, there are categories, subcategories, and even finer ways to classify entries. In the case of biometrics, one needs to group presentations of the same individual together as one single class, and those of different individuals as multiple classes. The presentation format could be iris, fingerprint, or face, etc. Among them, face is of high interest, because of its uniqueness as well as high availability—there are far more images of human faces than other modalities.

Recent progress applying neural networks to computer vision problems greatly advanced facial recognition. An effective neural network (model) is able to create embedding vectors as output for input face images. These vectors are close to each other in high-dimensional space if they belong to the same individual, far apart if they belong to different people. The degree of closeness is called similarity. A commonly used similarity metric is "cosine similarity", which corresponds to a particular vector arithmetic, ranging from −1 to 1, the higher the value, the closer the vectors in comparison.

The challenge of scale in a face search process comes from the comparison step—how to retrieve and operate on only the small portions of a database that are highly likely to contain potential matches? After all, it is not efficient to exhaustively search through the entire database for a given probe image. The database consists of embedding vectors, and matches are not literal or exact, but instead based on similarity scores and a search threshold, i.e., how close they are to the query vector. Therefore, the index that is useful in this scenario is called a nearest-neighbor index. This methodology poses new challenges to database design, and is at the forefront of research and development.

Accordingly, there is a strong need for improved methods and systems for indexing embedding vectors, particularly at above-billion scale for fast high-recall retrieval.

SUMMARY

This disclosure addresses the need mentioned above in a number of aspects. In one aspect, this disclosure provides a method for indexing vectors of image data. In some embodiments, the method comprises:
 a) distributing from a vector store a plurality of batches of vectors of the image data respectively to a first set of nodes, wherein each of the first set of nodes receives a batch of vectors;
 b) deduplicating vectors in the batch of the vectors in each of the first set of nodes by removing duplicated vectors to obtain a deduplicated vector batch, wherein the duplicated vectors have a similarity score with another vector in the batch of vectors that is equal to or greater than a similarity threshold;
 c) generating a vector index based on the deduplicated vector batch in each of the first set of nodes;
 d) performing steps a) to b) to obtain an additional batch-deduplicated vector batch, then deduplicating against the vector index, wherein the duplicated vectors have a similarity score with another vector in the vector index that is equal to or greater than the similarity threshold, and combining the index-deduplicated vector batch into the vector index in each of the set of nodes;
 e) repeating step d) until there is no remaining vector in the vector store;
 f) selecting one node from the first set of nodes, and replicating the vector index of the selected node in each of a second set of nodes, wherein the second set of nodes have fewer nodes than the first set of nodes;
 g) reconstructing vectors from the vector index of each of the first set of nodes excluding the selected node, combining the reconstructed vectors, and saving the combined reconstructed vectors to a new vector store;
 h) performing steps a), c), and e) to obtain a second vector index of each of the second set of nodes; and
 i) repeating steps f) to h) until only one node remains to obtain a final vector index of the image data.

In some embodiments, the vector index is generated based on a Hierarchical Navigable Small Worlds (HNSW) vector index data structure.

In some embodiments, the batch of vectors comprise vectors representing disjoint classes. In some embodiments, the vector store comprises vectors at an above-billion scale. In some embodiments, the batch of vectors comprise k-dimensional feature vectors. In some embodiments, the k-dimensional feature vector is generated by a deep neural network (DNN).

In some embodiments, the second set of nodes has half the number of nodes of the first set of nodes.

In some embodiments, the similarity threshold is between about 0.2 and about 0.6. In some embodiments, the similarity threshold is between about 0.35 and about 0.4.

In some embodiments, the image data comprises iris, face, fingerprint, hand/palm scan, or vein scan image data.

In some embodiments, prior to step a), the method comprises generating a vector for each of images in the image data. In some embodiments, at step b), deduplicating vectors in the batch of the vectors comprises comparing each vector in the batch of vectors to each vector in the deduplicated vector batch, such that the deduplicated vector batch grows incrementally by adding the non-duplicated vectors from comparisons. In some embodiments, at step d), deduplicating the additional batch-deduplicated vector batch against the vector index comprises approximating nearest-neighbor comparison using a HNSW vector index data structure.

In another aspect, this disclosure provides a method of searching an image. In some embodiments, the method comprises: receiving a query image; generating a query vector based on one or more features of the query image; generating, according to the method described herein, a vector index for vectors of image data in a database as an assigner index; generating an on-disk vector database, wherein bucket placements of the on-disk vector database are guided by the assigner index; and identifying candidate vectors through the assigner index and the vector database, wherein the query vector and the candidate vectors have similarity scores equal to or greater than a similarity threshold.

In some embodiments, the method comprises linking a candidate image from the candidate vector.

In another aspect, this disclosure provides a system for indexing vectors of image data. In some embodiments, the system comprises: a non-transitory, computer-readable memory; one or more processors; and a computer-readable medium containing programming instructions that, when executed by the one or more processors, configure the system to:

1) distribute from a vector store a plurality of batches of vectors of the image data respectively to a first set of nodes, wherein each of the first set of nodes receives a batch of vectors; 2) deduplicate vectors in the batch of the vectors in each of the first set of nodes by removing duplicated vectors to obtain a deduplicated vector batch, wherein the duplicated vectors have a similarity score with another vector in the batch of vectors that is equal to or greater than a similarity threshold;
3) generate a vector index based on the deduplicated vector batch in each of the first set of nodes;
4) perform steps 1) to 2) to obtain an additional batch-deduplicated vector batch, then deduplicating against the vector index, wherein the duplicated vectors have a similarity score with another vector in the vector index that is equal to or greater than the similarity threshold, and combining the index-deduplicated vector batch into the vector index in each of the set of nodes;
5) repeat step 4) until there is no remaining vector in the vector store;
6) select one node from the first set of nodes, and replicate the vector index of the selected node in each of a second set of nodes, wherein the second set of nodes have fewer nodes than the first set of nodes;
7) reconstruct vectors from the vector index of each of the first set of nodes excluding the selected node, combining the reconstructed vectors, and saving the combined reconstructed vectors to a new vector store;
8) perform steps 1), 3), and 5) to obtain a second vector index of each of the second set of nodes; and
9) repeat steps f) to h) until only one node remains to obtain a final vector index of the image data.

In some embodiments, the batch of vectors comprise vectors representing disjoint classes. In some embodiments, the vector store comprises vectors at an above-billion scale. In some embodiments, the batch of vectors comprise k-dimensional feature vectors. In some embodiments, the k-dimensional feature vector is generated by a deep neural network (DNN).

In some embodiments, the second set of nodes has half the number of nodes of the first set of nodes.

In some embodiments, the similarity threshold is between about 0.2 and about 0.6. In some embodiments, the similarity threshold is between about 0.35 and about 0.4.

In some embodiments, the image data comprises iris, face, fingerprint, hand/palm scan, or vein scan image data.

In some embodiments, the system is configured, prior to step 1), to generate a vector for each of images in the image data. In some embodiments, at step 2) for deduplicating vectors in the batch of the vectors, the system is configured comparing each vector in the batch of vectors to each vector in the deduplicated vector batch, such that the deduplicated vector batch grows incrementally by adding the non-duplicated vectors from comparisons. In some embodiments, at step 4) for deduplicating the additional batch-deduplicated vector batch against the vector index, the system is configured to approximate nearest-neighbor comparison using a HNSW vector index data structure.

In yet another aspect, this disclosure provides a system of searching an image. In some embodiments, the system comprises: a vector indexing engine comprising the system described herein; a non-transitory, computer-readable memory; one or more processors; and a computer-readable medium containing programming instructions that, when executed by the one or more processors, configure the system to: receive a query image; generate a query vector based on one or more features of the query image; generate, by the vector indexing engine, a vector index for vectors of image data in a database as an assigner index; generate an on-disk vector database, wherein bucket placements of the on-disk vector database are guided by the assigner index; and identify candidate vectors through the assigner index and the vector database, wherein the query vector and the candidate vectors have similarity scores equal to or greater than a similarity threshold.

In some embodiments, the system is configured to link a candidate image from the candidate vector.

The foregoing summary is not intended to define every aspect of the disclosure, and additional aspects are described in other sections, such as the following detailed description. The entire document is intended to be related as a unified disclosure, and it should be understood that all combinations of features described herein are contemplated, even if the combination of features are not found together in the same sentence, or paragraph, or section of this document. Other features and advantages of the invention will become apparent from the following detailed description. It should be understood, however, that the detailed description and the specific examples, while indicating specific embodiments of the disclosure, are given by way of illustration only, because various changes and modifications within the spirit and scope of the disclosure will become apparent to those skilled in the art from this detailed description.

DETAILED DESCRIPTION

This disclosure provides novel methods and systems for indexing embedding vectors (e.g., feature vectors) representing disjoint classes at above-billion scale for fast high-recall retrieval. Most of the existing technological solutions tackle problems at the sub-billion scale in terms of data points, ranging typically from a couple of million to a hundred million. Embedding vectors are stored in computers' precious CPU memory, instead of on disk, which is more affordable, but much slower. As the field of artificial intelligence (AI) keeps growing, more recently problems at above-billion scale have pushed storage and compute limits, and more importantly, the way vectors are indexed in the first place. The disclosed methods and systems address above-billion scale image (e.g., face image) search problems by building a new vector database, the new Nearest Neighbor Database (referred to as "new NNDB") based on a novel architecture for indexing vectors. This new architecture reduces computing costs by 80%, while bringing in over ten times throughput improvement, with even more room to save with more data to add. Moreover, it is more accurate in matching and vector reconstruction enabled by lighter compression in the abundance of disk storage, and capable of gracefully handling long-tail queries. In addition, reads and writes are unified with minimal locking. Because of its on-disk nature, it can be managed more like a proper database for maintenance purposes.

Figure 1:
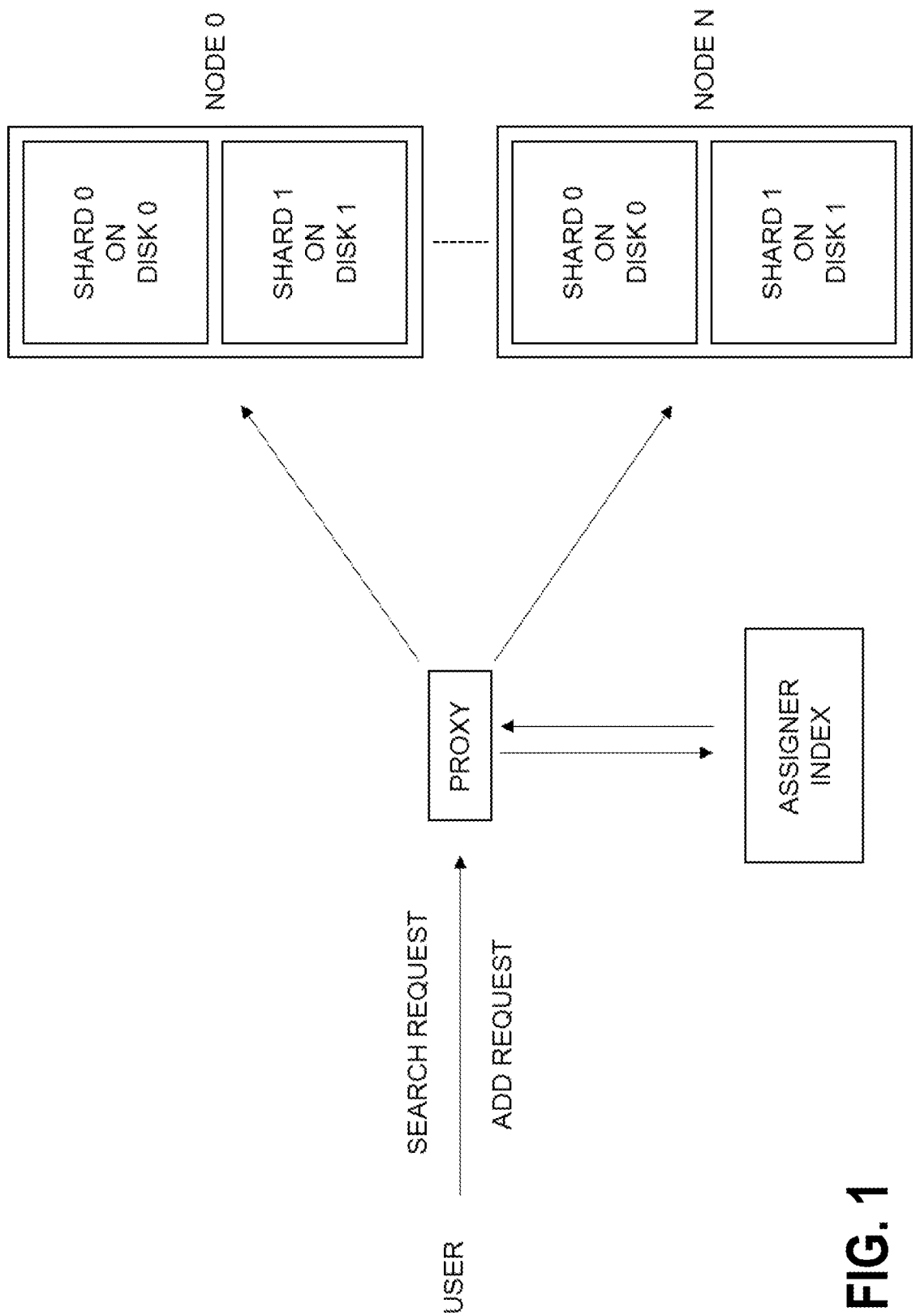
FIG. 1 shows an example process for searching with an assigner index and BucketDB.

As shown in FIG. 1, in the architecture, shards are on fast SSDs on only a few nodes. There is a separate assigner index to narrow down the search. With this configuration, reads and writes can be combined with minimal locking. This architecture was developed around the concept of "inverted file," serving as the on-disk storage backend, called BucketDB. "Inverted file," as used herein, refers to a broad indexing data structure, rather than a specific keyword-based document retrieval method. It comes along with an overly large graph index serving as the in-memory assigner. This index was constructed to represent diversity of images (e.g., the demographic diversity of human faces). The assigner's job is to suggest the nearest-K buckets, out of much more buckets, to visit during a search request, and designate a bucket to store an embedding vector during an "add" request. These requests, along with their assigned buckets, are passed to BucketDB for actual reads and writes.

Notably, the BucketDB was made possible by the combination of Faiss and RocksDB. Faiss is a powerful library for efficient similarity search and clustering of high-dimensional vectors. It provides the inverted file structure, various single instruction, multiple data (SIMD)-enabled (de-)compression/comparison algorithms, and parallel bucket scanning for nearest neighbors. On the other hand, RocksDB is a high-performance embedded key-value store that provides fast, scalable, and reliable storage and access of data. A binding layer was created to enable Faiss's inverted file structure to read from and write to RocksDB in parallel. By leveraging the strengths of Faiss and RocksDB, a highly scalable vector database (referred to as "new NNDB") can be created, as demonstrated in this disclosure. The new NNDB addresses the needs of efficiently storing and searching faces at the above-billion scale and beyond.

Two-Stage Architecture

The database consists of embedding vectors, and matches are not literal or exact, but instead based on similarity scores and a search threshold, i.e., how close they are to the query vector. Therefore, the index is called a nearest-neighbor index. This methodology poses new challenges to the database world, and is at the forefront of research and development. Certain trade-offs have to be made for the index to be suitable for production and scalable use. So technically the more appropriate term to describe this is "approximate nearest-neighbor index" (ANN). This type of index and databases that use it are getting increasingly more attention, because embedding vectors are a common form of output from neural networks, whether it be for computer vision (CV) tasks, or natural language processing (NLP) with large language models (LLMs).

The facial recognition algorithm works impressively well in practice, but it can only do so to a certain extent based on a small face crop. As a result, if one wants to retrieve 90%+ of all potential matches in the database of a probe face image, it would be necessary to cast a very wide net, leading to very expensive resource utilization. Significant challenges exist to support a growing vector database approaching 30 billion faces and potentially a lot more, where there was not a simple, cost-effective solution in research or on the market.

The existing state-of-the-art solutions, such as the component Nearest Neighbor Database (referred to as "old NNDB"). It was built upon an in-memory ANN index core, orchestrating multiple index shards on a single node, and many nodes behind a "proxy." Each search query went through the proxy, and got executed on the nodes parallelly. Each node then launched a parallel group of searches into the index shards. Results were aggregated on the node stage, and then the proxy stage, to derive the global nearest neighbors of the full database. Aiming at recovering the vast majority of potential matches for a given probe face image, one has to perform exhaustively search through 1~2% of the entire database (hundreds of millions of vector comparisons) activating hundreds of CPU cores for an extended period of time. However, it is necessary to scale up throughput for more concurrent users.

More challenging was that all the vector data had to be stored in memory. Despite heavy numerical compression, the vector data still took up multiple terabytes (TBs) of space. In addition, due to read-write locking, new data must be added to a write-only node until it was full before bringing it online. This not only made loading and unloading during maintenance cycles very tedious, but also prevented the component from being treated like an actual database that would support frequent read and write operations. Notably, once the database surpassed a few billion vectors, the difficulties started to compound and quickly became very serious. Thus, a better alternative must be developed.

In the past three years, several solutions emerged that aimed to tackle billion-scale vector search problems. Due to the greater scale, CPU memory as a precious resource had to give way to cheaper solid-state drives (SSDs). However, the same algorithms suitable for in-memory computations at smaller scales struggled with the new paradigm. The reason for this is that retrieving data from SSDs incurs a large amount of random access and throughput overhead, in addition to the already prohibitively expanding vector comparison cost. To put it plainly, if the vast majority of vector data get moved out of memory to become part of a proper on-disk database, there needs to be a more effective, and manageable indexing mechanism that reduces the search space substantially, so that only a very small portion of the entire database gets visited during each search.

The architecture for vector indexing can be broadly categorized into single-stage and multi-stage. The single-stage architecture indexes all vectors in the same data structure, either based on hashing, trees, or graphs. They are best suited for small amounts of data that can be fit into the computer random-access memory (RAM). On the other hand, the multi-stage architecture allows one to decide on the right granularity of narrowing down the search at each stage, taking into account each stage's access patterns and resource constraints. As an example, when adding a vector, the first stage pass would assign a bucket for a vector out of millions of buckets, and in the second stage the vector would be actually placed in the bucket storage. Searching a vector goes through a similar path, i.e., going through a multitude of buckets that are highly likely to contain the matching data. The first stage needs to be very fast, and the second stage needs to host a lot more data.

Hierarchical Navigable Small Worlds (HNSW) is an index structure very accurate at scale. It does have the cost of taking up extra space, and needs to be stored in memory due to its access pattern. However, once created for a given dataset, learning its statistical distribution, it can serve as a compass and drive the on-disk placement and search of far more vectors. Building a huge database can be divided into two stages.

Stage 1: in-memory graph index is used to assign the buckets incoming vectors should be put into.

Stage 2: it stores those actual vectors in the assigned buckets on disk.

Searching a vector goes through a similar path, by using a graph index as the assigner (or coarse quantizer in other conventions), representative enough of the underlying data.

Index Building Methods

An effective assigner index can be used to reduce search space substantially at the first stage, so that only a very small portion of the entire database gets visited during each search at later stages. A HNSW index is suitable for this purpose, but the vectors that would constitute the index needed to be carefully selected. Each vector in the index corresponds to a bucket where actual vectors are stored at later stages. Methods to build the HNSW index will be further described below. This is intimately related to the statistical distribution of the embedding vector data.

Existing methods suitable for a sub-billion scale use K-means to compute vector centroids of a representative sample of the dataset under consideration, referred to as the "index training" step. These centroids constitute the index, therefore the buckets. However, this method leads to underwhelming recall vs. search space trade-offs, because of the high dimensionality of embedding vector data and their distribution pattern. For example, training for 4096 centroids, one would need to scan through 100 centroid buckets to achieve a high recall, 2.4% of the entire database. Training 65536 centroids leads to scanning through 1024 centroid buckets, 1.6% of the database. Training for more centroids (e.g., million-scale) leads to significant training time, but will not improve the search space percentage much.

Accordingly, three different methods have been examined to select bucket vectors in the assigner index:

(1) Randomly sample the high-dimensional space. This leads to orders of magnitude more bucket vectors than necessary to represent the dataset, because of high dimensionality, and the fact that face embedding vectors tend to only take up small portions of the space. Therefore, it will not satisfy the requirement of putting the index in RAM.

(2) Randomly sample vector datasets. This leads to "hotkey" problems—there are some identities that have overwhelming numbers of face images, such as celebrities. This would crowd up the resulting subset for the index.

(3) Conduct a dataset-level dedupe reduction operation by a similarity threshold to create an evenly distributed subset that represents our dataset. This could be computationally expensive, but once created, it would represent the dataset well.

In this disclosure, method (3) above was adopted for building a vector index.

Building Vector Indexes

Figure 2:
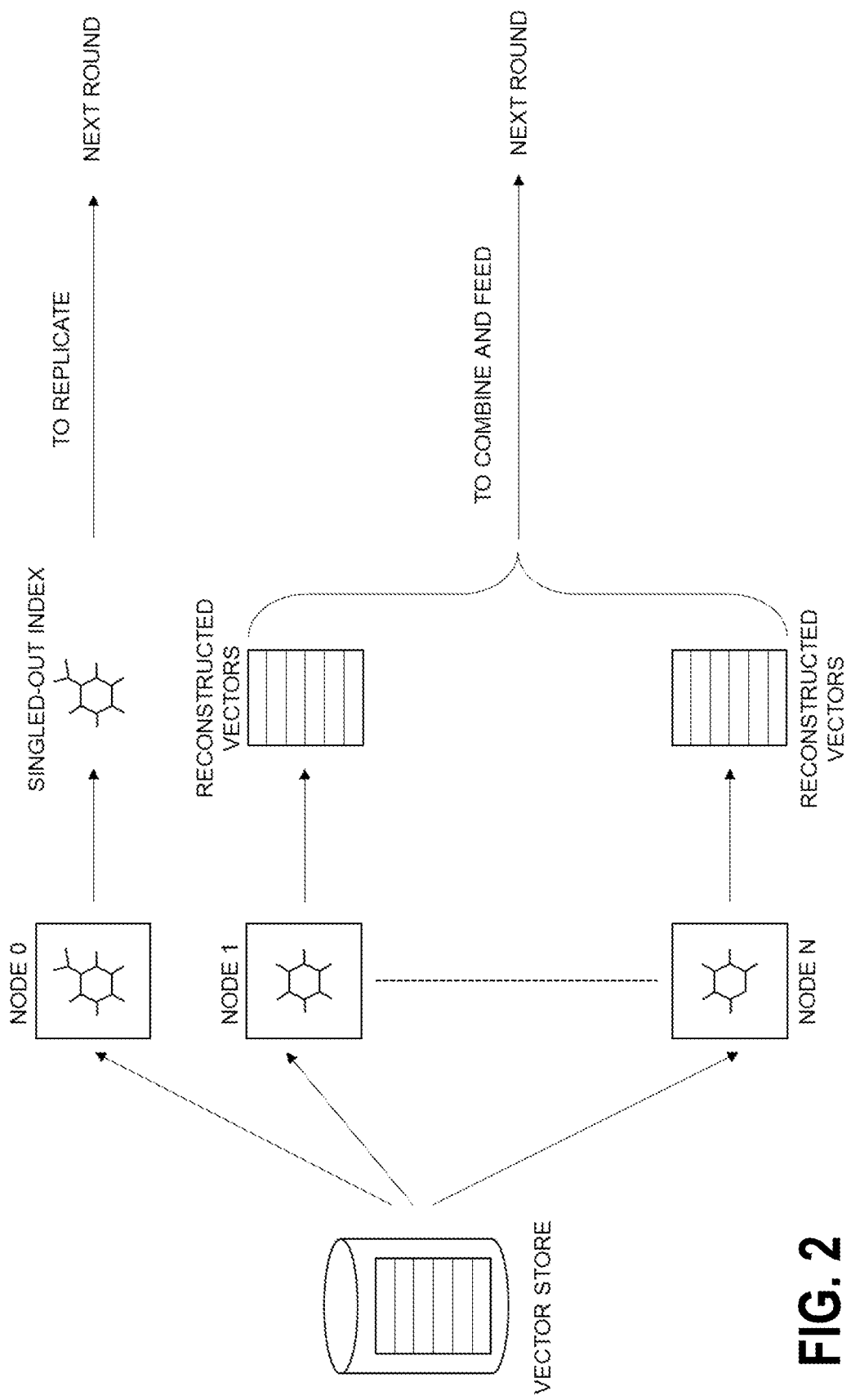
FIG. 2 shows an example process for building an assigner vector index.

Referring to FIG. 2, an example process of building a vector index is illustrated. To carry out a dataset-level dedupe reduction operation at above-billion scale, a multitude (N0) of computer nodes, each with a multitude of CPU cores, are utilized in parallel.

(a) Each node hosts a growing HNSW index that evaluates incoming batches of vectors, decides which ones in a batch are not duplicates by a similarity threshold T (e.g., 0.35~0.4), and adds them to itself, such that the index incrementally grows. Each batch first dedupes itself beforehand. The entire dataset is to be fed and consumed by these N0 nodes, which result in N0 indexes at this step.

(b) However, these indexes might contain duplicate vectors to each other. Therefore, one index is singled out that contains a unique subset X of vectors, and replicate it across a fraction of nodes, N1 (e.g., N0/2). As a result, each of N1 nodes contains a copy of the singled-out index replicated from the singled-out node of N0 nodes. Next, the vectors in the remaining N0-1 indexes are reconstructed, saved, and fed as incoming batches of vectors to each of the N1 nodes. On each node, the incoming batches of vectors are also deduplicated against the index. After deduplication, the incoming batches of vectors will be added to the index, such that the index incrementally grows. There are fewer vectors than the original dataset due to the initial round of dedupe operations, thus taking less computation to complete. Upon completion, N0 indexes will be reduced into N1 indexes.

(c) Again, other than the original X vectors, the added vectors to the N1 indexes contain duplicates to each other. Therefore, one index is singled out, which contains X (from previous run)+Y (from current run) unique vectors, and replicated across a smaller fraction of nodes, N2 (e.g., N1/2). As a result, each of N2 nodes contains a copy of the singled-out index replicated from the singled-out node of N1 nodes. Next, the vectors in the remaining N1-1 indexes that are not in X are reconstructed, saved, and fed as incoming batches of vectors to each of the N1 nodes. On each node, the incoming batches of vectors are also deduplicated against the index. After deduplication, the incoming batches of vectors will be added to the index, such that the index incrementally grows. Upon completion, N1 indexes will be reduced into N2 indexes.

(d) Steps (a)-(c) are performed in cycles, eventually resulting in one single index without replication to dedupe the reconstructed and saved vectors from other nodes.

The resulting index is one that is evenly distributed and represents the dataset well. Its size will be evaluated to find a machine that contains the appropriate amount of RAM to host it as the assigner index. This index can be used to drive the on-disk placement and search of far more vectors. Advantageously, a search only needs to scan through 0.0001~0.001% of the entire database, instead of 1~2% of the entire database, leading to tremendous savings on computational resources.

Figure 3:
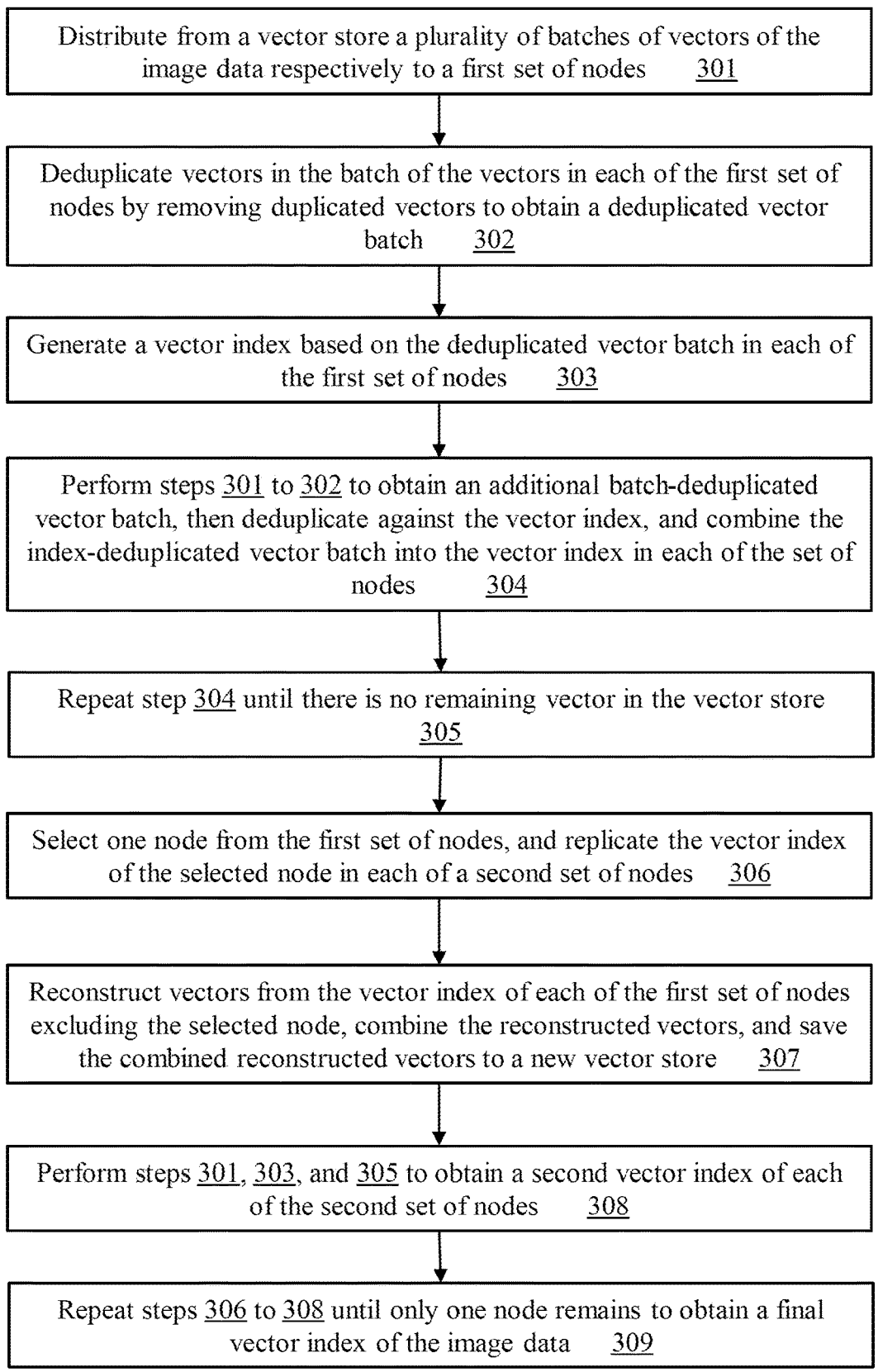
FIG. 3 shows an example process of indexing vectors of image data.

Referring now to FIG. 3, a method for indexing vectors of image data is provides, according to various embodiments of this disclosure. In some embodiments, at 301, the method may include distributing from a vector store a plurality of batches of vectors of the image data respectively to a first set of nodes, wherein each of the first set of nodes receives a batch of vectors.

At 302, the method may include deduplicating vectors in the batch of the vectors in each of the first set of nodes by removing duplicated vectors to obtain a deduplicated vector batch, wherein the duplicated vectors have a similarity score (e.g., cosine similarity score) with another vector in the batch of vectors that is equal to or greater than a similarity threshold.

At 303, the method may include generating a vector index based on the deduplicated vector batch in each of the first set of nodes.

At 304, the method may include performing steps 301 to 302 to obtain an additional batch-deduplicated vector batch, then deduplicating against the vector index, wherein the duplicated vectors have a similarity score (e.g., cosine similarity score) with another vector in the vector index that is equal to or greater than the similarity threshold, and combining the index-deduplicated vector batch into the vector index in each of the set of nodes.

At 305, the method may include repeating step 304 until there is no remaining vector in the vector store.

At 306, the method may include selecting one node from the first set of nodes, and replicating the vector index of the selected node in each of a second set of nodes, wherein the second set of nodes have fewer nodes than the first set of nodes.

At 307, the method may include reconstructing vectors from the vector index of each of the first set of nodes excluding the selected node, combining the reconstructed vectors, and saving the combined reconstructed vectors to a new vector store.

At 308, the method may include performing steps 301, 303, and 305 to obtain a second vector index of each of the second set of nodes; and.

At 309, the method may include repeating steps 306 to 308 until only one node remains to obtain a final vector index of the image data.

In some embodiments, the vector index is generated based on a Hierarchical Navigable Small Worlds (HNSW) vector index data structure. HNSW incrementally builds a hierarchical, multi-layer graph structure consisting of a nested subset of stored elements. The lowest layer contains all elements. Higher layers consist of a subset of elements of the layer beneath it. Elements in each higher layer subset are randomly selected with an exponentially decaying probability. Elements are connected to each other if they are close based on some distance metric. Additional heuristics are often employed to ensure that all regions are connected, i.e., there are no disjointed clusters. The nearest neighbor search algorithm uses a greedy, zooming-in approach. For every query point, it starts at an entry point node in the top-most layer and recursively performs a greedy (best-first) graph traversal in each layer, gradually zooming in, until it reaches a local minimum in the bottommost one. Because it only proximate the elements for each layer, the graphs have logarithmic or polylogarithmic scaling of the greedy graph routing. The HNSW algorithm combines the small world phenomenon with long range links. Global knowledge of the data distribution. Setting hubs are the starting points improves the chances that nodes can be found.

In some embodiments, the batch of vectors comprise vectors representing disjoint classes. Disjoint classes of image content will have tags that do not significantly overlap one another. Two (or more) classes are disjoint if there is no instance belonging to all these classes.

In some embodiments, the vector store may include vectors at an above-billion scale (e.g., 1, 2, 3, 4, 5, 6, 7, 8, 9, 10 billion or more).

In some embodiments, the batch of vectors comprise k-dimensional feature vectors. In some embodiments, the k-dimensional feature vector is generated by a deep neural network (DNN). The output of the DNN may be a sparse feature vector, which may be defined as a feature vector having a value of zero in more than a predefined percentage of its dimensions, such as more than 10%, 20%, 25%, 50%, 75%, 80%, 90%, 95%, or 99%. As will be discussed further below, one or more of the layers of the DNN may be specifically configured in order to achieve sparsity in output feature vectors by forcing or encouraging one or more values in feature vectors to be set to zero. One advantage of sparse feature vectors is that they may be effectively binarized (as will be discussed below) into compact binary vectors, which may allow for efficient searching and comparison of binary vectors, such as by sub-linear searching.

In some embodiments, the DNN may be configured to generate sparse feature vectors having a fixed number of dimensions (e.g., a fixed number of values or elements in each vector). The number of dimensions in an output feature vector may be defined by a final layer of a DNN, which may reduce a larger number of dimensions to the final output number of dimensions. In some embodiments, the number of dimensions in output vectors may be adjustable by a user, or may be dynamically determined by the system. In some embodiments, output feature vectors having 320 dimensions, 512 dimensions, 1024 dimensions, 2048 dimensions, 4096 dimensions, or other suitable numbers of dimensions may be used. The number of dimensions for an output feature vector may be chosen or set, in some embodiments, in accordance with constraints of file size, such that feature vectors are small enough to be stored in large quantities or to be transmitted quickly and efficiently. In some embodiments, output feature vectors may have 256 dimensions, which may be an advantageous size because it may be fit into two 128-bit machine instructions.

In some embodiments, the second set of nodes has fewer number of nodes than the first set of nodes. For example, if the first set of nodes have N nodes, the second set of nodes can have M nodes, where N and M are integers and M can be any integer from 1 to N−1 (e.g., N−1, N−2, N−3, N−4, N−5 . . . 3, 2, 1). In some embodiments, the second set of nodes has half the number of nodes of the first set of nodes (i.e., M=N/2).

In some embodiments, the similarity threshold is between about 0.2 and about 0.6 (e.g., 0.2, 0.25, 0.3, 0.35, 0.4, 0.45, 0.5, 0.55, 0.6). In some embodiments, the similarity threshold is between about 0.35 and about 0.4 (e.g., 0.35, 0.36, 0.37, 0.38, 0.39, 0.4).

In some embodiments, the image data may include biometric data, such as iris, face, fingerprint, hand/palm scan, or vein scan image data.

In some embodiments, prior to step a), the method may include generating a vector for each of images in the image data. In some embodiments, at step b), deduplicating vectors in the batch of the vectors may include comparing each vector in the batch of vectors to each vector in the deduplicated vector batch, such that the deduplicated vector batch grows incrementally by adding the non-duplicated vectors from comparisons.

In some embodiments, at step d), deduplicating the additional batch-deduplicated vector batch against the vector index may include approximating nearest-neighbor comparison using a HNSW vector index data structure.

As used herein, "deduplication" refers to the process of removing redundant instances of the same data segment or portion (e.g., vectors) when that data segment or portion is included multiple times within a larger collection of data. Deduplication processes may replace the redundant instances of the same data segment or portion with a reference to a single instance of the data segment. Deduplication may thereby reduce the amount of storage space used to store data, reduce computation, and increase efficiency of search.

In some embodiments, for deduplication, the method may include determining a similar score (e.g., cosine similarity score) between two vectors for comparison.

In another aspect, this disclosure provides a method of searching an image. In some embodiments, the method may include: receiving a query image; generating a query vector based on one or more features of the query image; generating, according to the method described herein, a vector index for vectors of image data in a database as an assigner index; generating an on-disk vector database, wherein bucket placements of the on-disk vector database are guided by the assigner index; and identifying candidate vectors through the assigner index and the vector database, wherein the query vector and the candidate vectors have similarity scores equal to or greater than a similarity threshold. In some embodiments, the method may include linking a candidate image from the candidate vector.

In some embodiments, a face image can be uploaded as a probe. The image is then preprocessed, which includes alignment, distortion correction, and/or cropping. Next, the preprocessed image is turned into a high-dimensional numeric vector through embedding extraction. Finally, the probe's embedding vector is compared against relevant parts of a database, and the database returns a set of potential matches if any is present, ranked by their similarity to the input face. Based on similarity thresholds and a human-in-the-loop investigative process, the results can then be used to assist in the process of identifying an individual or verifying their identity.

In another aspect, this disclosure provides a system for indexing vectors of image data. In some embodiments, the system may include: a non-transitory, computer-readable memory; one or more processors; and a computer-readable medium containing programming instructions that, when executed by the one or more processors, configure the system to:

1) distribute from a vector store a plurality of batches of vectors of the image data respectively to a first set of nodes, wherein each of the first set of nodes receives a batch of vectors;
2) deduplicate vectors in the batch of the vectors in each of the first set of nodes by removing duplicated vectors to obtain a deduplicated vector batch, wherein the duplicated vectors have a similarity score with another vector in the batch of vectors that is equal to or greater than a similarity threshold;
3) generate a vector index based on the deduplicated vector batch in each of the first set of nodes;
4) perform steps 1) to 2) to obtain an additional batch-deduplicated vector batch, then deduplicating against the vector index, wherein the duplicated vectors have a similarity score with another vector in the vector index that is equal to or greater than the similarity threshold, and combining the index-deduplicated vector batch into the vector index in each of the set of nodes;
5) repeat step 4) until there is no remaining vector in the vector store;
6) select one node from the first set of nodes, and replicate the vector index of the selected node in each of a second set of nodes, wherein the second set of nodes have fewer nodes than the first set of nodes;
7) reconstruct vectors from the vector index of each of the first set of nodes excluding the selected node, combining the reconstructed vectors, and saving the combined reconstructed vectors to a new vector store;
8) perform steps 1), 3), and 5) to obtain a second vector index of each of the second set of nodes; and
9) repeat steps f) to h) until only one node remains to obtain a final vector index of the image data.

In yet another aspect, this disclosure provides a system of searching an image. In some embodiments, the system may include: a vector indexing engine comprising the system described herein; a non-transitory, computer-readable memory; one or more processors; and a computer-readable medium containing programming instructions that, when executed by the one or more processors, configure the system to: receive a query image; generate a query vector based on one or more features of the query image; generate, by the vector indexing engine, a vector index for vectors of image data in a database as an assigner index; generate an on-disk vector database, wherein bucket placements of the on-disk vector database are guided by the assigner index; and identify candidate vectors through the assigner index and the vector database, wherein the query vector and the candidate vectors have similarity scores equal to or greater than a similarity threshold. In some embodiments, the system is configured to link a candidate image from the candidate vector.

Figure 4:
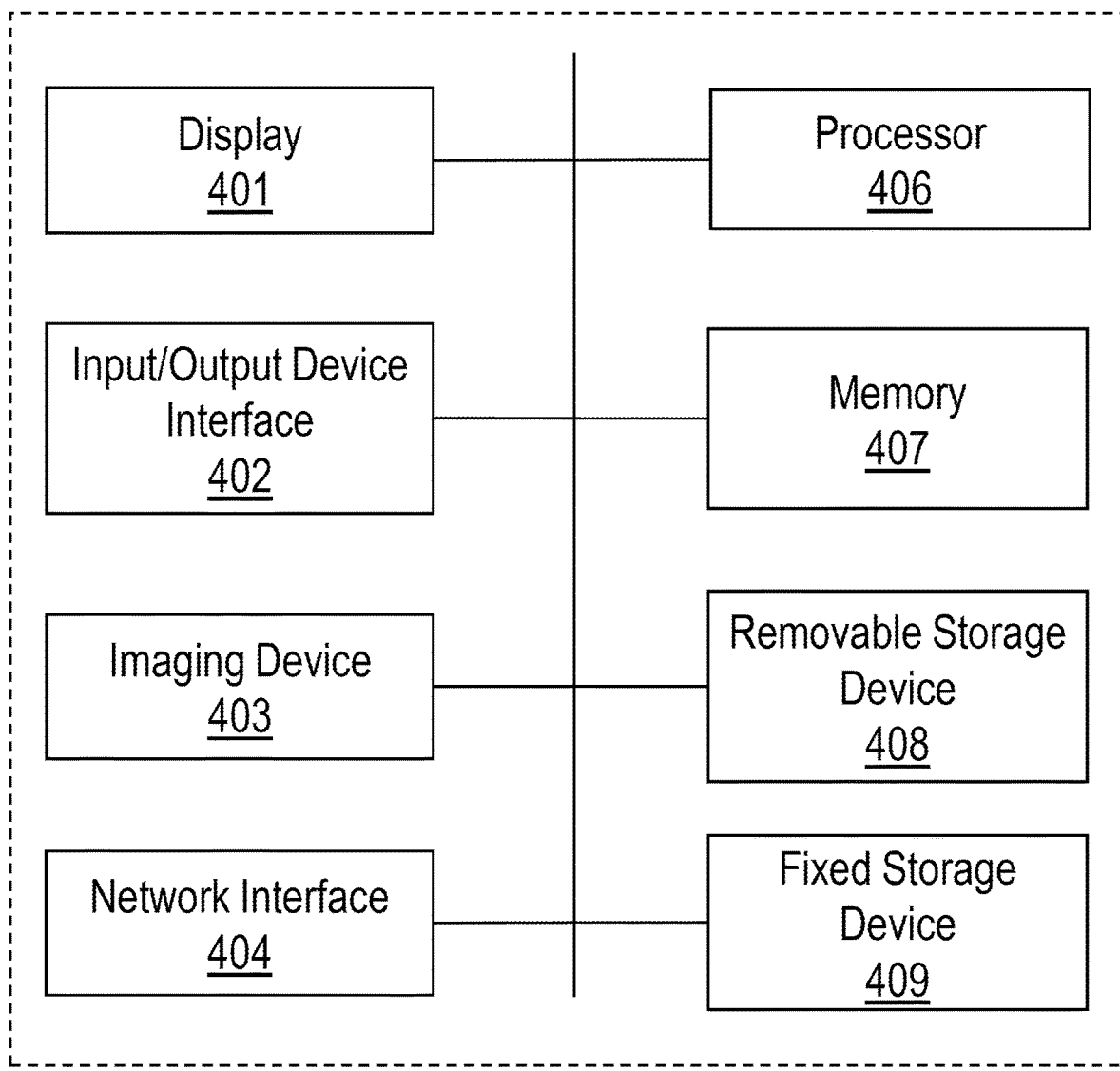
FIG. 4 shows an example computing system for implementing the disclosed methods.

FIG. 4 is a functional diagram illustrating a programmed computer system in accordance with some embodiments. As will be apparent, other computer system architectures and configurations can be used to perform the described methods. Computer system 400, which includes various subsystems as described below, includes at least one microprocessor subsystem (also referred to as a processor or a central processing unit (CPU) 406). For example, processor 406 can be implemented by a single-chip processor or by multiple processors. In some embodiments, processor 406 is a general-purpose digital processor that controls the operation of the computer system 400. In some embodiments, processor 406 also includes one or more coprocessors or special purpose processors (e.g., a graphics processor, a network processor, etc.). Using instructions retrieved from memory 407, processor 406 controls the reception and manipulation of input data received on an input device (e.g., image processing device 403, I/O device interface 402), and the output and display of data on output devices (e.g., display 401).

Processor 406 is coupled bi-directionally with memory 407, which can include, for example, one or more random access memories (RAM) and/or one or more read-only memories (ROM). As is well known in the art, memory 407 can be used as a general storage area, a temporary (e.g., scratchpad) memory, and/or a cache memory. Memory 407 can also be used to store input data and processed data, as well as to store programming instructions and data, in the form of data objects and text objects, in addition to other data and instructions for processes operating on processor 406. Also, as is well known in the art, memory 407 typically includes basic operating instructions, program code, data, and objects used by the processor 406 to perform its functions (e.g., programmed instructions). For example, memory 407 can include any suitable computer-readable storage media described below, depending on whether, for example, data access needs to be bi-directional or uni-directional. For example, processor 406 can also directly and very rapidly retrieve and store frequently needed data in a cache memory included in memory 407.

A removable mass storage device 408 provides additional data storage capacity for the computer system 400 and is optionally coupled either bi-directionally (read/write) or uni-directionally (read-only) to processor 406. A fixed mass storage 409 can also, for example, provide additional data storage capacity. For example, storage devices 408 and/or 409 can include computer-readable media such as magnetic tape, flash memory, PC-CARDS, portable mass storage devices such as hard drives (e.g., magnetic, optical, or solid-state drives), holographic storage devices, and other storage devices. Mass storages 408 and/or 409 generally store additional programming instructions, data, and the like that typically are not in active use by the processor 406. It will be appreciated that the information retained within mass storages 408 and 409 can be incorporated, if needed, in a standard fashion as part of memory 407 (e.g., RAM) as virtual memory.

In addition to providing processor 406 access to storage subsystems, bus 410 can be used to provide access to other subsystems and devices as well. As shown, these can include a display 401, a network interface 404, an input/output (I/O) device interface 402, an image processing device 403, as well as other subsystems and devices. For example, image processing device 403 can include a camera, a scanner, etc.; I/O device interface 402 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a global positioning system (GPS) receiver, a differential global positioning system (DGPS) receiver, an accelerometer, and/or any other appropriate device interface for interacting with system 400. Multiple IO device interfaces can be used in conjunction with computer system 400. The I/O device interface can include general and customized interfaces that allow the processor 406 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 404 allows processor 406 to be coupled to another computer, computer network, or telecommunications network using a network connection as shown. For example, through the network interface 404, the processor 406 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 406 can be used to connect the computer system 400 to an external network and transfer data according to standard protocols. For example, various process embodiments disclosed herein can be executed on processor 406 or can be performed across a network such as the Internet, intranet networks, or local area networks, in conjunction with a remote processor that shares a portion of the processing. Additional mass storage devices (not shown) can also be connected to processor 406 through network interface 404.

In addition, various embodiments disclosed herein further relate to computer storage products with a computer-readable medium that includes program code for performing various computer-implemented operations. The computer-readable medium includes any data storage device that can store data that can thereafter be read by a computer system. Examples of computer-readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system as shown in FIG. 4 is an example of a computer system suitable for use with the various embodiments disclosed herein. Other computer systems suitable for such use can include additional or fewer subsystems. In some computer systems, subsystems can share components (e.g., for touchscreen-based devices such as smartphones, tablets, etc., I/O device interface 402 and display 401 share the touch-sensitive screen component, which both detects user inputs and displays outputs to the user). In addition, bus 410 is illustrative of any interconnection scheme serving to link the subsystems. Other computer architectures having different configurations of subsystems can also be utilized.

Additional Definitions

To aid in understanding the detailed description of the compositions and methods according to the disclosure, a few express definitions are provided to facilitate an unambiguous disclosure of the various aspects of the disclosure. Unless otherwise defined, all technical and scientific terms used herein have the same meaning as commonly understood by one of ordinary skill in the art to which this disclosure belongs.

The terms or acronyms like "convolutional neural network," "CNN," "neural network," "NN," "deep neural network," "DNN," "recurrent neural network," "RNN," and/or the like may be interchangeably referenced throughout this document.

In some embodiments, a graphics processing unit (GPU) is communicatively coupled to host/processor cores to accelerate graphics operations, machine-learning operations, pattern analysis operations, and various general-purpose GPU (GPGPU) functions. The GPU may be communicatively coupled to the host processor/cores over a bus or another interconnect (e.g., a high-speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

Aspects of the present disclosure are described herein with reference to flowchart illustrations and/or block diagrams of methods, apparatus (systems), and computer program products according to embodiments of the invention. In some embodiments, the flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It will be understood that, although the terms "first," "second," etc., may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Unless specifically stated otherwise, as apparent from the above discussion, it is appreciated that throughout the description, discussions utilizing terms such as "processing," "performing," "receiving," "computing," "calculating," "determining," "identifying," "displaying," "providing," "merging," "combining," "running," "transmitting," or the like, refer to the action and processes of a computer system, or similar electronic computing device, that manipulates and transforms data represented as physical (or electronic) quantities within the computer system memories or registers or other such information storage, transmission or display devices.

It is noted here that, as used in this specification and the appended claims, the singular forms "a," "an," and "the" include plural reference unless the context clearly dictates otherwise. The terms "including," "comprising," "containing," or "having" and variations thereof are meant to encompass the items listed thereafter and equivalents thereof as well as additional subject matter unless otherwise noted.

As used herein, "plurality" means two or more. As used herein, a "set" of items may include one or more of such items.

The phrases "in one embodiment," "in various embodiments," "in some embodiments," and the like are used repeatedly. Such phrases do not necessarily refer to the same embodiment, but they may unless the context dictates otherwise.

The terms "and/or" or "/" means any one of the items, any combination of the items, or all of the items with which this term is associated.

The term "if may be construed to mean "when" or "upon" or "in response to determining" or "in response to detecting," depending on the context. Similarly, the phrase "if it is determined" or "if [a stated condition or event] is detected" may be construed to mean "upon determining" or"in response to determining" or "upon detecting [the stated condition or event]" or "in response to detecting [the stated condition or event]," depending on the context.

As used herein, the term "each," when used in reference to a collection of items, is intended to identify an individual item in the collection but does not necessarily refer to every item in the collection. Exceptions can occur if explicit disclosure or context clearly dictates otherwise.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All methods described herein are performed in any suitable order unless otherwise indicated herein or otherwise clearly contradicted by context. In regard to any of the methods provided, the steps of the method may occur simultaneously or sequentially. When the steps of the method occur sequentially, the steps may occur in any order, unless noted otherwise.

In cases in which a method comprises a combination of steps, each and every combination or sub-combination of the steps is encompassed within the scope of the disclosure, unless otherwise noted herein.

Each publication, patent application, patent, and other reference cited herein is incorporated by reference in its entirety to the extent that it is not inconsistent with the present disclosure. Publications disclosed herein are provided solely for their disclosure prior to the filing date of the present invention. Nothing herein is to be construed as an admission that the present invention is not entitled to antedate such publication by virtue of prior invention. Further, the dates of publication provided may be different from the actual publication dates which may need to be independently confirmed.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of searching an of image, comprising:
   generating a vector index for vectors of image data in a database as an assigner index by:
   a) distributing from a vector store a plurality of batches of vectors of the image data respectively to a first set of nodes, wherein each of the first set of nodes receives a batch of vectors;
   b) deduplicating vectors in the batch of the vectors in each of the first set of nodes by removing duplicated vectors to obtain a deduplicated vector batch, wherein the duplicated vectors have a similarity score with another vector in the batch of vectors that is equal to or greater than a similarity threshold;
c) generating a vector index based on the deduplicated vector batch in each of the first set of nodes;
d) performing steps a) to b) to obtain an additional batch-deduplicated vector batch, then deduplicating against the vector index, wherein the duplicated vectors have a similarity score with another vector in the vector index that is equal to or greater than the similarity threshold, and combining the index-deduplicated vector batch into the vector index in each of the set of nodes;
e) repeating step d) until there is no remaining vector in the vector store;
f) selecting one node from the first set of nodes, and replicating the vector index of the selected node in each of a second set of nodes, wherein the second set of nodes have fewer nodes than the first set of nodes;
g) reconstructing vectors from the vector index of each of the first set of nodes excluding the selected node, combining the reconstructed vectors, and saving the combined reconstructed vectors to a new vector store;
h) performing steps a), c), and e) to obtain a second vector index of each of the second set of nodes; and
i) repeating steps f) to h) until only one node remains to obtain a final vector index of the image data;
generating an on-disk vector database, wherein bucket placements of the on-disk vector database are guided by the assigner index;
receiving a query image;
generating a query vector based on one or more features of the query image; and
identifying candidate vectors through the assigner index and the vector database, wherein the query vector and the candidate vectors have similarity scores equal to or greater than a similarity threshold.

2. The method of claim 1, wherein the vector index is generated based on a Hierarchical Navigable Small Worlds (HNSW) vector index data structure.

3. The method of claim 1, wherein the batch of vectors comprise vectors representing disjoint classes.

4. The method of claim 1, wherein the batch of vectors comprise k-dimensional feature vectors.

5. The method of claim 1, wherein the vector store comprises vectors at an above-billion scale.

6. The method of claim 1, wherein the second set of nodes has half the number of nodes of the first set of nodes.

7. The method of claim 1, wherein the similarity threshold is between about 0.2 and about 0.6.

8. The method of claim 7, wherein the similarity threshold is between about 0.35 and about 0.4.

9. The method of claim 1, wherein the image data comprises iris, face, fingerprint, hand/palm scan, or vein scan image data.

10. The method of claim 1, wherein prior to step a), the method comprises generating a k-dimensional feature vector for each of images in the image data.

11. The method of claim 10, wherein the k-dimensional feature vector is generated by a deep neural network (DNN).

12. The method of claim 1, wherein at step b), deduplicating vectors in the batch of the vectors comprises comparing each vector in the batch of vectors to each vector in the deduplicated vector batch, such that the deduplicated vector batch grows incrementally by adding the non-duplicated vectors from comparisons.

13. The method of claim 1, wherein at step d), deduplicating the additional batch-deduplicated vector batch against the vector index comprises approximating nearest-neighbor comparison using a Hierarchical Navigable Small Worlds (HNSW) vector index data structure.

14. The method of claim 1, comprising linking a candidate image from the candidate vector.

15. A system for searching an image, comprising:
a non-transitory, computer-readable memory;
one or more processors; and
a computer-readable medium containing programming instructions that, when executed by the one or more processors, configure the system to:
1) distribute from a vector store a plurality of batches of vectors of image data in a database respectively to a first set of nodes, wherein each of the first set of nodes receives a batch of vectors;
2) deduplicate vectors in the batch of the vectors in each of the first set of nodes by removing duplicated vectors to obtain a deduplicated vector batch, wherein the duplicated vectors have a similarity score with another vector in the batch of vectors that is equal to or greater than a similarity threshold;
3) generate a vector index based on the deduplicated vector batch in each of the first set of nodes;
4) perform steps 1) to 2) to obtain an additional batch-deduplicated vector batch, then deduplicating against the vector index, wherein the duplicated vectors have a similarity score with another vector in the vector index that is equal to or greater than the similarity threshold, and combining the index-deduplicated vector batch into the vector index in each of the set of nodes;
5) repeat step 4) until there is no remaining vector in the vector store;
6) select one node from the first set of nodes, and replicate the vector index of the selected node in each of a second set of nodes, wherein the second set of nodes have fewer nodes than the first set of nodes;
7) reconstruct vectors from the vector index of each of the first set of nodes excluding the selected node, combining the reconstructed vectors, and saving the combined reconstructed vectors to a new vector store;
8) perform steps 1), 3), and 5) to obtain a second vector index of each of the second set of nodes;
9) repeat steps 6) to 8) until only one node remains to obtain a final vector index of the image data, wherein the final vector index is an assigner index;
generate an on-disk vector database, wherein bucket placements of the on-disk vector database are guided by the assigner index;
receive a query image;
generate a query vector based on one or more features of the query image; and
identify candidate vectors through the assigner index and the vector database, wherein the query vector and the candidate vectors have similarity scores equal to or greater than a similarity threshold.

16. The system of claim 15, wherein the vector index is generated based on a Hierarchical Navigable Small Worlds (HNSW) vector index data structure.

17. The system of claim 15, wherein the batch of vectors comprise vectors representing disjoint classes.

18. The system of claim 15, wherein the batch of vectors comprise k-dimensional feature vectors.

19. The system of claim 15, wherein the vector store comprises vectors at an above-billion scale.

20. The system of claim 15, wherein the second set of nodes has half the number of nodes of the first set of nodes.

21. The system of claim 15, wherein the similarity threshold is between about 0.2 and about 0.6.

22. The system of claim 21, wherein the similarity threshold is between about 0.35 and about 0.4.

23. The system of claim 15, wherein the image data comprises iris, face, fingerprint, hand/palm scan, or vein scan image data.

24. The system of claim 15, wherein the system is configured, prior to step 1), to generate a k-dimensional feature vector for each of images in the image data.

25. The system of claim 24, wherein the k-dimensional feature vector is generated by a deep neural network (DNN).

26. The system of claim 15, wherein at step 2) for deduplicating vectors in the batch of the vectors, the system is configured to compare each vector in the batch of vectors to each vector in the deduplicated vector batch, such that the deduplicated vector batch grows incrementally by adding the non-duplicated vectors from comparisons.

27. The system of claim 15, wherein at step 4) for deduplicating the additional batch-deduplicated vector batch against the vector index, the system is configured to approximate nearest-neighbor comparison using a Hierarchical Navigable Small Worlds (HNSW) vector index data structure.

28. The system for searching an image of claim 15, further configured to link a candidate image from the candidate vector.

* * * * *